United States Patent
Hamabe et al.

(10) Patent No.: US 8,229,444 B2
(45) Date of Patent: Jul. 24, 2012

(54) CELLULAR SYSTEM, CARRIER ALLOCATION METHOD THEREOF, BASE STATION, AND MOBILE STATION

(75) Inventors: Kojiro Hamabe, Tokyo (JP); Mitsuyuki Nakamura, Tokyo (JP); Nahoko Kuroda, Tokyo (JP)

(73) Assignee: NEC Corporation, Tokyo (JP)

(*) Notice: Subject to any disclaimer, the term of this patent is extended or adjusted under 35 U.S.C. 154(b) by 463 days.

(21) Appl. No.: 12/373,067

(22) PCT Filed: Jul. 13, 2007

(86) PCT No.: PCT/JP2007/063996
§ 371 (c)(1),
(2), (4) Date: Jan. 9, 2009

(87) PCT Pub. No.: WO2008/007775
PCT Pub. Date: Jan. 17, 2008

(65) Prior Publication Data
US 2010/0003998 A1 Jan. 7, 2010

(30) Foreign Application Priority Data
Jul. 13, 2006 (JP) .................... 2006-192884

(51) Int. Cl.
*H04W 72/00* (2009.01)
(52) U.S. Cl. ..... 455/450; 455/453; 455/448; 455/452.1; 455/454; 455/455; 455/509
(58) Field of Classification Search .................. 455/453, 455/448, 450, 452.1, 454, 455, 509
See application file for complete search history.

(56) References Cited

U.S. PATENT DOCUMENTS

| | | | | |
|---|---|---|---|---|
| 5,504,937 A | * | 4/1996 | Kangas | 455/453 |
| 5,551,060 A | | 8/1996 | Fujii et al. | |
| 6,069,871 A | * | 5/2000 | Sharma et al. | 370/209 |

(Continued)

FOREIGN PATENT DOCUMENTS
EP 5 31090 9/1992
(Continued)

OTHER PUBLICATIONS

Japanese Office Action mailed Dec. 26, 2011 in corresponding Japanese Application No. 2008-524857 with partial English translation.

(Continued)

*Primary Examiner* — Kwasi Karikari
(74) *Attorney, Agent, or Firm* — Young & Thompson

(57) ABSTRACT

In a method of allocating carriers of a cellular system comprising mobile stations and a wireless network of multiple base stations, multiple carriers being available for communication between base and mobile stations, the wireless network performs the following. Carriers are divided into first and second carriers, and allocated the same for each cell formed by the base stations. Each mobile station is classified as an intracell-inner-area or an intracell-outer-area mobile station. Communication is performed with the intracell-inner-area and intracell-outer-area mobile stations by the first and second carriers, respectively. A status of use of the first carriers in a first cell is measured based on communicated data, as is that of the second carriers in a second cell. The number of second carriers in the second cell is changed based on at least the status of use of the first carriers and the status of use of the second carriers.

12 Claims, 10 Drawing Sheets

U.S. PATENT DOCUMENTS

| | | | |
|---|---|---|---|
| 6,201,972 B1 * | 3/2001 | Hamabe | 455/450 |
| 2004/0097238 A1 | 5/2004 | Hwang et al. | |
| 2007/0237075 A1 * | 10/2007 | Chen et al. | 370/229 |

FOREIGN PATENT DOCUMENTS

| | | |
|---|---|---|
| EP | 946 071 | 9/1999 |
| EP | 1418776 | 6/2004 |
| JP | 05-063634 | 3/1993 |
| JP | 06 311089 | 11/1994 |
| JP | 08-009464 | 1/1996 |
| JP | 10-117373 | 5/1998 |
| JP | 11-205848 | 7/1999 |
| JP | 11-275625 | 10/1999 |
| JP | 2000-138965 | 5/2000 |
| JP | 2004-159345 | 6/2004 |
| JP | 2005-027189 | 1/2005 |

OTHER PUBLICATIONS

Serizawa Mutsumu and Asakawa Shigeru, Interruption Characteristics of Distributed Dynamic Channel Allocation with Reuse Partitioning and Power Control, IEICE Transactions. B-II, communication II—wireless communication & wireless application, The Institute of Electronics, Information and Communication Engineers, Jun. 25, 1995, J78-B-2(6), pp. 421-434.

Ishikawa Yoshihiro and Umeda Narumi, Multiple Overlaid Priority Dynamic Channel Assignment (MOP-DCA), IEICE Technical Report. CS, Communication Systems, The Institute of Electronics, Information and Communication Engineers, Jun. 23, 1994, 94(108), pp. 73-78.

Ishikawa Yoshihiro and Umeda Narumi, Multiple Overlaid Priority Adaptive Channel Allocation (MOP-ACA), IEICE Transactions. B-II, communication II—wireless communication & wireless application, The Institute of Electronics, Information and Communication Engineers, Oct. 25, 1995, J78-B-2(10), pp. 646-654.

Ishikawa Yoshihiro and Umeda Narumi, A Study on Multiple overlaid Priority Dynamic Channel Assignment (MOP-DCA), Proceedings of IEICE fall conference, The Institute of Electronics, Information and Communication Engineers, Sep. 26, 1994, 1994 Communication (1), p. 275.

Kojima Fumihide, Sanpei Seiich and Morinaga Norihiko, A Control Scheme for Multi-layered Cell with Different Band Widths, IEICE Technical Report. RCS, Wireless Communication Systems, The Institute of Electronics, Information and Communication Engineers, Feb. 19, 1997, 96(529), pp. 79-85.

* cited by examiner

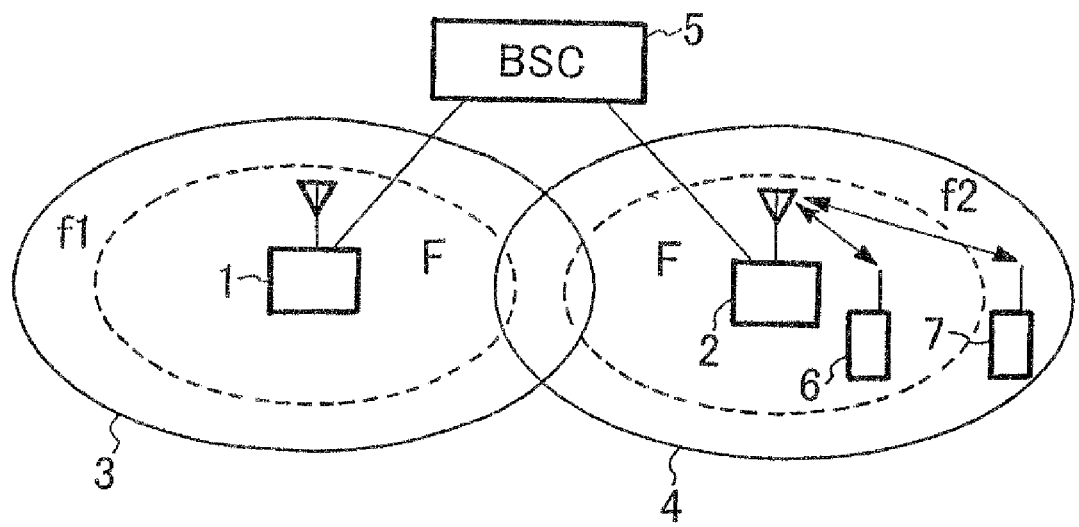
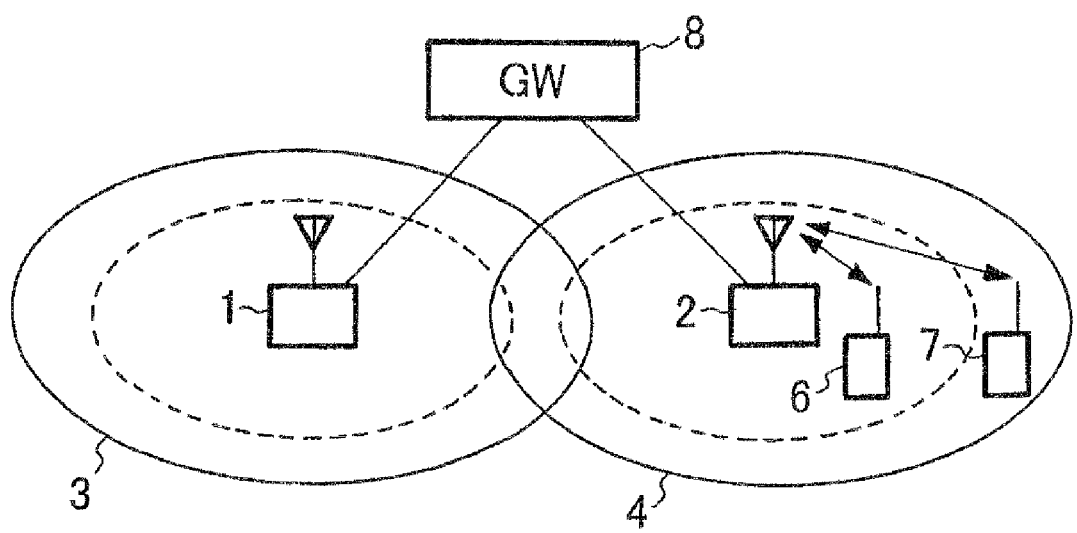

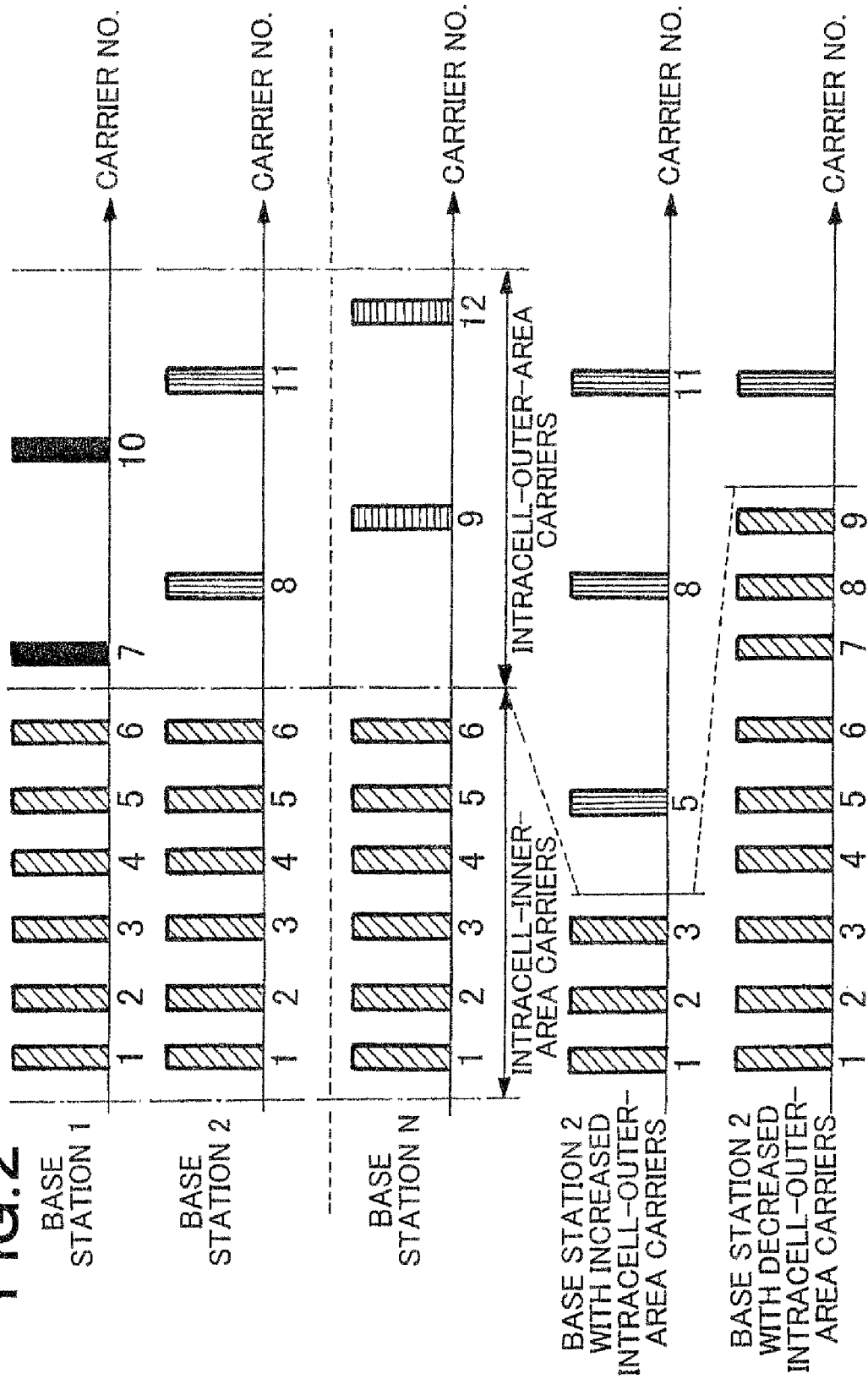

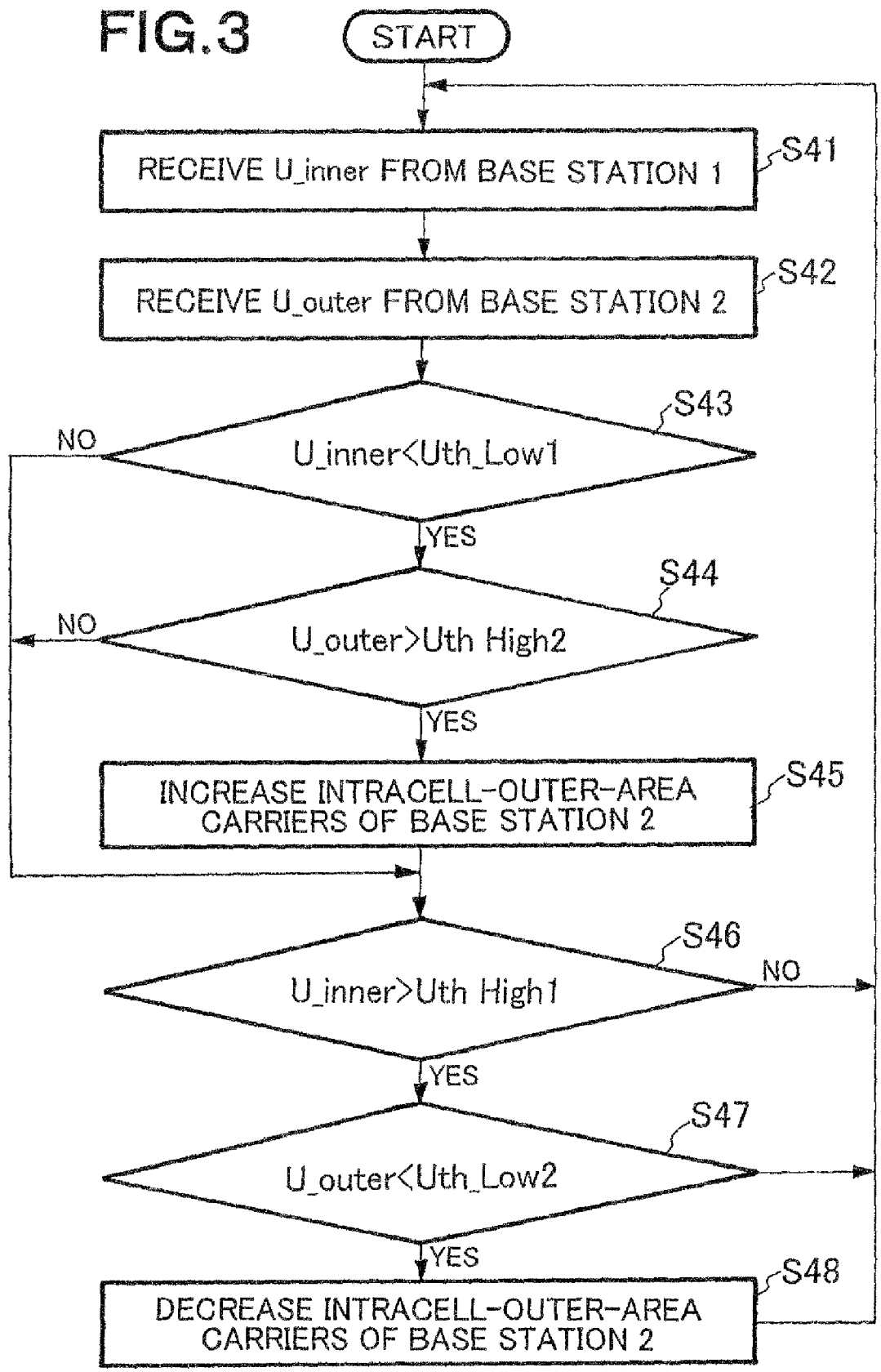

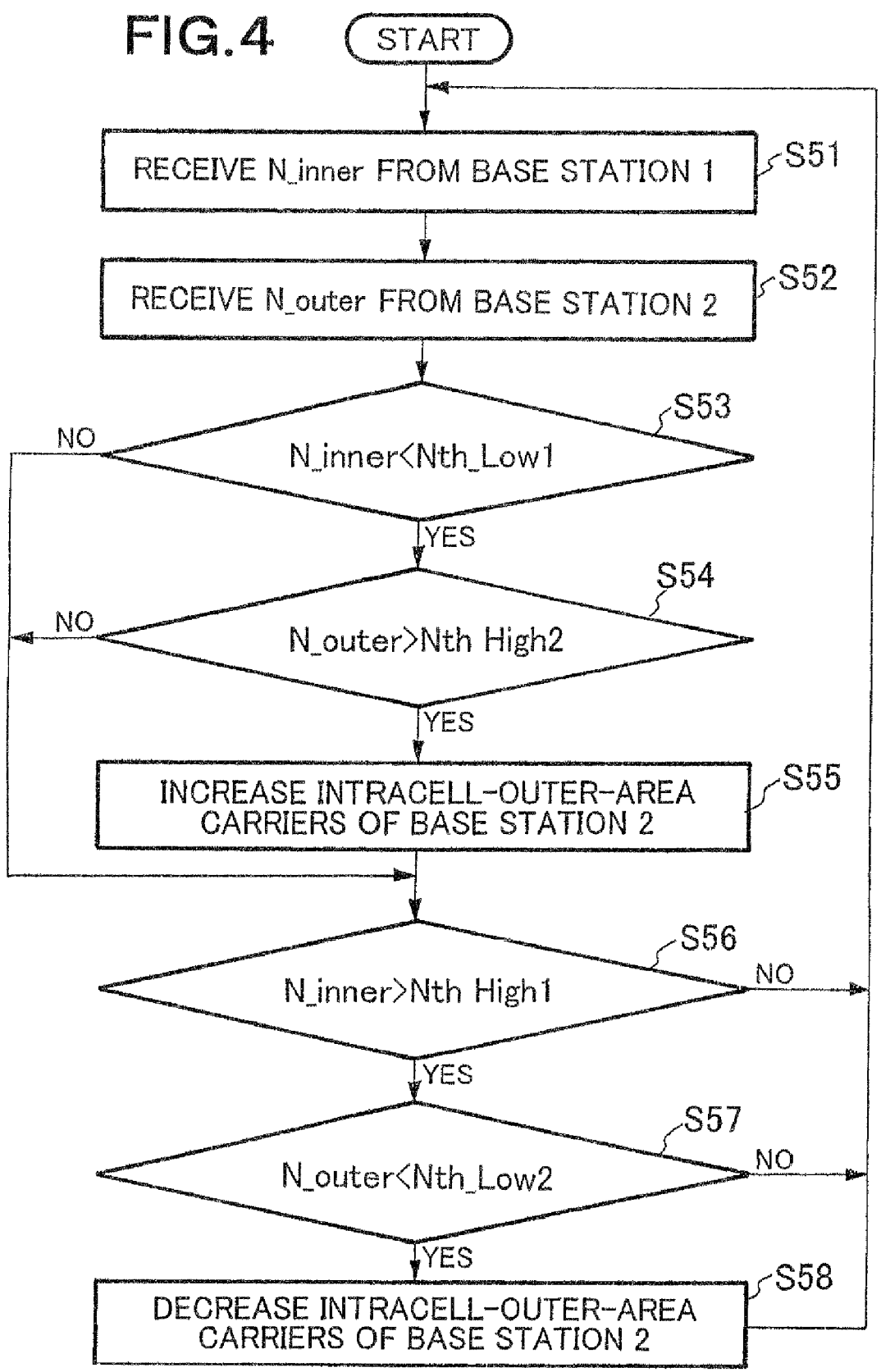

CELLULAR SYSTEM, CARRIER ALLOCATION METHOD THEREOF, BASE STATION, AND MOBILE STATION

TECHNICAL FIELD

The present invention relates to a cellular system, a carrier allocation method thereof, a base station, and a mobile station, and more particularly to a method of allocating carriers of a cellular system in which communication is performed between a wireless network and mobile stations by using different carriers in the inner side and outer side of a cell.

BACKGROUND ART

Among known mobile communication systems is a cellular system in which a wireless network composed of at least a plurality of base stations performs communication with a large number of mobile stations lying in one or more cells formed by the respective base stations. In this cellular system, the same frequency carriers (hereinafter, referred to as "carriers") are used in a plurality of cells simultaneously so that large amounts of user information can be communicated between the wireless network and the large number of mobile stations.

For this cellular system, such a method as shown in FIG. 9 has been known in order to make the same carriers simultaneously usable in as many cells as possible. According to this method, each cell's coverage is sectioned into two areas, an area closer to the base station (hereinafter, referred to "intracell inner area") and an area farther from the base station (hereinafter, referred to as "intracell outer area"). For the intracell outer areas, predetermined carriers are divided into three groups (f1, f2, f3), for example. The carriers of each group are only assigned to every three cells so as not to be used in adjoining cells simultaneously. Meanwhile, other carriers (F) are assigned to the intracell inner areas.

This method of assigning and using different carriers in the intracell inner areas and intracell outer areas has been described, for example, in Patent Document 1.

To practice this method of using carriers, the base stations transmit a common pilot signal with predetermined transmission power in the respective cells. Mobile stations receive the common pilot signal from a plurality of neighboring base stations, and measure the received power. The mobile stations then select a cell of the highest received power as their own cell to perform communication with, and a cell of the second highest common pilot signal as an adjoining cell. If the ratio between the received power of the common pilot signal of the own cell and that of the adjoining cell is higher than or equal to a predetermined threshold (hereinafter, referred to as "intracell-inner-area threshold"), the carriers for the intracell inner area are used. If not, the carriers for the intracell outer area are used. In another possible method, instead of using the ratio between the received powers of the common pilot signal, the carriers for the intracell inner area may be used if the reception quality of the common pilot from the own cell (such as the received power of the common pilot signal and the ratio between the received power and interference signal power) is higher than or equal to a predetermined threshold. If not, the carriers for the intracell outer area are used.

As above, in the cellular system where a plurality of carriers are simultaneously used in a plurality of cells, the spectral efficiency of the entire system improves and the traffic capacity increases when as many carriers as possible are made available at high use rates in as many cells as possible.

Patent Document 1: JP 6-311089-A

DISCLOSURE OF THE INVENTION

Problems to be Solved by the Invention

Suppose now that the cellular system of the foregoing conventional example assigns carriers (F) available for intracell-inner-area mobile stations and carriers (f1, f2, f3) available for intracell-outer-area mobile stations for use. For example, if the number of carriers (f1, f2, f3) available for intracell-outer-area mobile stations is too small, it is likely to run short of carriers that can be allocated for intracell outer areas while not fully utilizing carriers that are only available in intracell inner areas, with a drop in spectral efficiency. If the number of carriers (f1, f2, f3) available for intracell-outer-area mobile stations is too large, on the other hand, it runs short of carriers that are only available in intracell inner areas. Since fewer carriers can be used repeatedly within a single cell, the spectral efficiency drops.

The present invention has been achieved in view of the foregoing points. An exemplary object of the invention is to solve the foregoing problems and to optimize the carrier assignment between the inner areas and outer areas of the cells for improved use efficiency of the carriers.

Means for Solving the Problems

To achieve the foregoing object, the present invention provides a method of allocating carriers of a cellular system comprising a wireless network and a plurality of mobile stations, the wireless network including at least a plurality of base stations, a plurality of carriers being available for communication between the base stations and the mobile stations, the method comprising: a step in which the wireless network divides the plurality of carriers into first carriers and second carriers, and allocates the same for each of a plurality of cells formed by the plurality of base stations; a step in which the wireless network classifies each of the plurality of mobile stations as an intracell-inner-area mobile station or an intracell-outer-area mobile station; a step in which the wireless network performs communication with the intracell-inner-area mobile station by using the first carriers, and performs communication with the intracell-outer-area mobile station by using the second carriers; a step in which the wireless network measures a status of use of the first carriers in a first cell out of the plurality of cells based on communicated data; a step in which the wireless network measures a status of use of the second carriers in a second cell out of the plurality of cells based on communicated data; and a step in which the wireless network changes the number of second carriers in the second cell based on at least the status of use of the first carriers in the first cell and the status of use of the second carriers in the second cell measured.

Advantages of the Invention

According to the present invention, it is possible to optimize the carrier assignment between the intracell inner areas and intracell outer areas, with an improvement to the use efficiency of the carriers.

BRIEF DESCRIPTION OF THE DRAWINGS

FIG. 1 is a block diagram of a cellular system according to examples 1 and 2 of the present invention;

FIG. 2 is an example of carrier assignment according to examples 1 to 4 of the present invention;

FIG. 3 is a flowchart showing a method of changing intra-cell-outer-area carriers according to example 1 of the present invention;

FIG. 4 is a flowchart showing a method of changing intra-cell-outer-area carriers according to example 2 of the present invention;

FIG. 5 is a block diagram of a cellular system according to examples 3 to 6 of the present invention;

Figure 6:
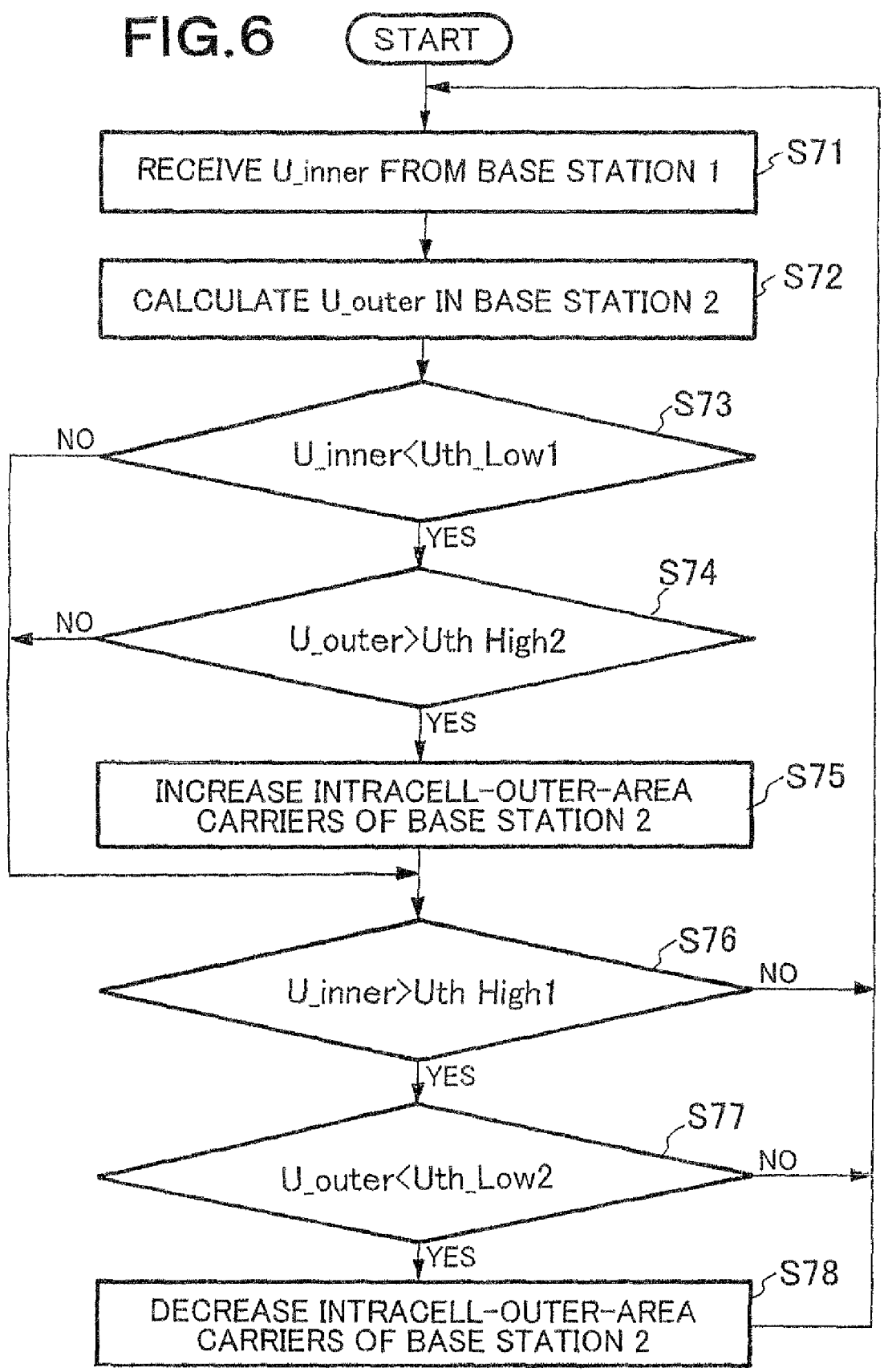
FIG. 6 is a flowchart showing a method of changing intra-cell-outer-area carriers according to example 3 of the present invention.

EXPLANATION OF REFERENCE SYMBOLS 1, 2: base station
3, 4: cell
5: base station controller (BSC)
6, 7: mobile station
8: gateway

BEST MODE FOR CARRYING OUT THE INVENTION

Next, an exemplary embodiment of the present invention will be described with reference to the drawings.

A cellular system according to the exemplary embodiment comprises a wireless network and a plurality of base stations, the wireless network including at least a plurality of base stations. A plurality of carriers is available for communication between the base stations and the mobile stations. This cellular system implements the following method of carrier allocation. Initially, the wireless network classifies each of the mobile stations as an intracell-inner-area mobile station or an intracell-outer-area mobile station. It then performs communication with intracell-inner-area mobile stations by using first carriers, and performs communication with intracell-outer-area mobile stations by using second carriers. Based on this communication, the status of use of the first carriers in a first cell is measured, and the status of use of the second carriers in a second cell is measured. As will be described, the statuses of use of the carriers to be measured include the use rates of the carriers and the average numbers of carriers used. Based on at least the status of use of the first carriers in the first cell and the status of use of the second carriers in the second cell measured thus, the number of second carriers in the second cell is changed.

Take, for example, the case of using the use rates as the statuses of use of the carriers. Here, the second cell shall be an own cell, and the first cell shall be a cell (adjoining cell) that adjoins to the own cell. The first carriers shall be carriers intended for intracell-inner-area mobile stations, and the second carriers shall be ones for intracell-outer-area mobile stations. If the use rate of the first carriers (carriers for intracell-inner-area mobile stations) in the first cell (adjoining cell) is lower than a predetermined first use rate threshold and the use rate of the second carriers (carriers for intracell-inner-area mobile stations) in the second cell (own cell) is higher than a predetermined second use rate threshold, the number of second carriers in the second cell is increased. This can reduce the possibility of running short of the second carriers in the second cell without substantially increasing the possibility of running short of the first carriers in the first cell. On the other hand, if the use rate of the first carriers in the first cell is higher than a predetermined third use rate threshold and the use rate of the second carriers in the second cell is lower than a predetermined fourth use rate threshold, the number of second carriers in the second cell is decreased. This makes it possible to reduce the possibility of running short of the second carriers in the second cell without substantially increasing the possibility of running short of the first carriers in the first cell. In consequence, it is possible to improve the use efficiency of the carriers in the cellular system.

That is, according to the exemplary embodiment, the allocation of the second carriers (intracell-outer-area carriers) for the second cell (own cell) is changed in consideration of the status of use, such as the use rate, of the first carriers (intracell-inner-area carriers) in the first cell (adjoining cell). This makes it possible to increase the intracell-outer-area carriers in the second cell (own cell) while avoiding interference resulting from the simultaneous use of the same carrier as in the intracell inner area of the first cell (adjoining cell).

Hereinafter, specific examples will be described with reference to the drawings.

Example 1

Description will initially be given of example 1 of the present invention.

FIG. 1 is a block diagram of a cellular system according to the present example. This cellular system comprises a wireless network and a plurality of mobile stations 6 and 7. Of these, the wireless network is composed of a plurality of base stations 1 and 2, communication areas or cells 3 and 4 which are covered by the respective base stations 1 and 2, and a base station controller 5 (BSC) which is connected with the base stations 1 and 2. This cellular system also includes a large number of other base stations and mobile stations, which are omitted from the diagram. In the present example, the cell 3 of the base station 1 corresponds to a first cell, and the cell 4 of the base station 2 corresponds to a second cell. The base station controller 5 changes the number of intracell-outer-area carriers of the base station 2 based on the use rate of the intracell-inner-area carriers, or first carriers, of the base station 1 and the use rate of the intracell-outer-area carriers, or second carriers, of the base station 2 (see the following description).

The cellular system shown in FIG. 1 is configured so that a plurality of carriers can be used for communication between the base stations 1 and 2 and the mobile stations 6 and 7. Each carrier is either an uplink carrier or a downlink carrier. Uplink channels and downlink channels use respective different carriers of frequency division duplex (FDD) system.

Each carrier is divided in units of transmission times. When performing communication between the base stations 1 and 2 and the mobile stations 6 and 7, carriers to be used for the mobile stations are selected, and are allocated transmission times in units of transmission times. Data blocks are transmitted during the transmission times.

The wireless network determines whether an intracell inner area or an intracell outer area where each of the mobile stations 6 and 7 is in, based on the propagation losses from the base stations 1 and 2 for the mobile stations 6 and 7 to communicate with and an intracell-inner-area threshold. Here, the propagation losses are reflected on the received power of pilot signals at the mobile stations 6 and 7, the pilot signals being transmitted from the base stations 1 and 2 with constant power.

This cellular system provides transmission power control such that the signals of the respective carriers approach a certain received power both in uplink and downlink channels. For that control method, the present example employs one of the most simple methods. With this method, intracell-inner-area carriers (first carriers) are given transmission power having a value of the transmission power of intracell-outer-area carriers (second carriers) multiplied by a predetermined coefficient smaller than 1, both in uplink and downlink channels, so that the intracell-inner-area carriers have transmission power smaller than the transmission carrier of the intracell-outer-area carriers.

In the case of FIG. 1, the base stations 1 and 2 transmit a pilot signal (not shown) with constant power each. The mobile stations 6 and 7 receive the pilot signals from the respective base stations 1 and 2, measure the received power P1 and P2, and notify the results to the base station controller 5. If the received power P2 of the pilot signal from the base station 2 is the highest, the base station controller 5 selects the base station 2 as one for performing communication with the mobile stations 6 and 7. Then, it selects the received power P1 of the pilot signal from the base station 1, which is the second highest. The ratio between the two, P2/P1, is then compared with the predetermined intracell-inner-area threshold of T. If P2/P1>=T, the mobiles stations 6 and 7 are determined to be in the intracell inner area in the cell of the base station 2. If P2/P1<T, on the other hand, the mobiles stations 6 and 7 are determined to be in the intracell outer area in the cell of the base station 2. In the case of FIG. 1, the mobile station 6 holds P2/P1>=T, being determined to be in the intracell inner area. The mobile station 7 applies to P2/P1<T, being determined to be in the intracell outer area. In this case, the cell 4 of the base station 2 corresponds to a first cell, and the cell 3 of the base station 1 corresponds to a second cell.

In the present example, a plurality of carriers for both uplink and downlink channels are divided into a carrier group F which corresponds to intracell-inner-area carriers, and carrier groups f1, f2, and f3 which correspond to intracell-outer-area carriers. Of these, the carrier group F is available for communication with mobile stations lying in the intracell inner area of every cell 3 and 4. The carrier group f1 is available for communication with mobile stations lying in the intracell outer area of the cell 3. The carrier group f2 is available for communication with mobile stations lying in the intracell outer area of the cell 4. Moreover, the carrier group f3 is available in the outer area of a cell other than the cells 3 and 4, which is not shown in the diagram.

In the case of FIG. 1, when the base station 2 performs communication with the mobile station 6 which lies in the intracell inner area of its cell 4, the carriers belonging to the carrier group F, i.e., intracell-inner-area carriers are selected for use. When the base station 2 performs communication with the mobile station 7 which lies in the intracell outer area of its cell 4, the carriers belonging to the carrier group f2, i.e., intracell-outer-area carriers are selected for use.

FIG. 2 shows the assignment of carriers to these carrier groups at a certain moment. This cellular system has 12 carriers (carrier Nos. 1 to 12) as the plurality of carriers available. Of these, six carriers (carrier Nos. 1 to 6) are assigned to the carrier group F. Two carriers (carrier Nos. 7 and 10) are assigned to the carrier group f1. Two carriers (carrier Nos. 8 and 11) are assigned to the carrier group f2. Two carriers (carrier Nos. 9 and 12) are assigned to the carrier group f3.

In FIG. 2, the six carriers belonging to the carrier group F (carrier Nos. 1 to 6), or intracell-inner-area carriers, are common among all the cells. They are not necessarily common among all the cells, however, and are determined cell by cell. As for intracell-outer-area carriers, any one of the carrier groups f1, f2, and f3 is assigned to each of the base stations which correspond to the respective cells. In the case of FIG. 2, the two carriers belonging to the carrier group f1 (carrier Nos. 7 and 10) are assigned to the base station 1 which covers the cell 3. The two carriers belonging to the carrier group f2 (carrier Nos. 8 and 11) are assigned to the base station 2 which covers the cell 4. The two carriers belonging to the carrier group f3 (carrier Nos. 9 and 12) are assigned to a base station N which covers a cell other than the cells 3 and 4.

The base stations 1 and 2 each calculate the use rate U_inner of the intracell-inner-area carriers at predetermined time intervals. In the present example, this use rate U_inner is calculated as follows. Initially, the base stations 1 and 2 each calculate the rates of time U_inner1, U_inner2, U_inner3, U_inner4, U_inner5, and U_inner6 at which the six carriers belonging to the carrier group F (carrier Nos. 1 to 6), or intracell-inner-area carriers, are used to transmit data blocks, respectively. Next, they calculate an average of these rates ((U_inner1+U_inner2+U_inner3+U_inner4+U_inner5+U_inner6)/6). The average calculated is the use rate U_inner of the intracell-inner-area carriers.

The base stations 1 and 2 each calculate the use rate U_outer of the intracell-outer-area carriers in a similar way.

Here, the base station 1 calculates the use rate U_outer of the intracell-outer-area carriers as follows. Initially, it calculates the rates of time U_outer7 and U_outer10 at which the two carriers belonging to the carrier group f1 (carrier Nos. 7 and 10), or intracell-outer-area carriers, are used to transmit data blocks, respectively. It then calculates an average of these rates ((U_outer7+U_outer10)/2). The average calculated is the use rate U_outer of the intracell-outer-area carriers.

The base station 2 calculates the use rate U_outer of the intracell-outer-area carriers as follows. Initially, it calculates the rates of time U_outer8 and U_outer11 at which the two carriers belonging to the carrier group f2 (carrier Nos. 8 and 11), or intracell-outer-area carriers, are used to transmit data blocks, respectively. It then calculates an average of these rates ((U_outer8+U_outer11)/2). The average calculated is the use rate U_outer of the intracell-outer-area carriers.

The base stations 1 and 2 each notify the foregoing calculations of the use rate U_inner of the intracell-inner-area carriers and the use rate U_outer of the intracell-outer-area carriers to the base station controller 5 at the predetermined time intervals mentioned above.

FIG. 3 is a flowchart showing the method of changing intracell-outer-area carriers according to the present example. The base station controller 5 initially receives the foregoing calculation of the use rate U_inner of the intracell-inner-area carriers from the base station 1, and receives the foregoing calculation of the use rate U_outer of the intracell-outer-area carriers from the base station 2 (steps S41 and S42).

If the use rate U_inner of the intracell-inner-area carriers from the base station 1 is lower than a predetermined first use rate threshold Uth_Low1 and the use rate U_outer of the intracell-outer-area carriers from the base station 2 is higher than a predetermined second use rate threshold Uth_High2, then the base station controller 5 increases the number of intracell-outer-area carriers of the base station 2 (steps S43, S44, and S45).

On the other hand, if the use rate U_inner of the intracell-inner-area carriers from the base station 1 is higher than a predetermined third use rate threshold Uth_High1 and the use rate U_outer of the intracell-outer-area carriers from the base station 2 is lower than a predetermined fourth use rate threshold Uth_Low2, then the base station controller 5 decreases the number of intracell-outer-area carriers of the base station 2 (steps S46, S47, and S48).

Here, the first use rate threshold Uth_Low1 is set to a value lower than the third use rate threshold Uth_High1. The fourth use rate threshold Uth_Low2 is set to a value lower than the second use rate threshold Uth_High2.

In the foregoing processing, intracell-outer-area carriers are increased/decreased in number according to a predetermined order of priority as to which carriers to be the intracell-outer-area carriers. Among the twelve carriers (carrier Nos. 1 to 12), ones having higher carrier numbers are used as intracell-outer-area carriers by priority. Moreover, the carrier groups f1, f2, and f3 of intracell-outer-area carriers can only include carriers that have carrier numbers with a remainder by 3 of 1, 2, and 0, respectively. The carrier group F of intracell-inner-area carriers can be changed in units of three carriers.

Suppose that the base station 2 increases the number of intracell-outer-area carriers by the foregoing processing. As shown by the base station 2 with increased intracell-outer-area carriers in the carrier assignment of FIG. 2, the carriers having the three highest carrier numbers (carrier Nos. 4 to 6) among the six carriers belonging to the carrier group F of intracell-inner-area carriers (carrier Nos. 1 to 6) are excluded from the intracell-inner-area carriers. One of the carriers (carrier No. 5) is then added to the intracell-outer-area carriers.

Suppose, on the other hand, that the base station 2 decreases the number of intracell-outer-area carriers by the foregoing processing. As shown by the base station 2 with decreased intracell-outer-area carriers in the carrier assignment of FIG. 2, the carrier with the lower carrier number (carrier No. 8) between the two carriers belonging to the carrier group f2 of intracell-outer-area carriers (carrier Nos. 8 and 11) is excluded from the intracell-outer-area carriers. That carrier (carrier No. 8) is then added to the intracell-inner-area carriers. In the case of FIG. 2, carriers belonging to the carrier groups f1 and f3 (carrier Nos. 7 and 9) are also excluded from the intracell-outer-area carriers and added to the intracell-inner-area carriers.

In this example, a carrier that is changed into an intracell-outer-area carrier in one cell may still be used as an intracell-inner-area carrier in adjoining cells. In such cases, the adjoining cells shall continue using the carrier as an intracell-inner-area carrier. Consequently, even if a carrier (carrier No. 5) belonging to the intracell-inner-area carriers is changed into an intracell-outer-area carrier in the cell 4 of the base station 2 as described above, that carrier (carrier number No. 5) continues being used as an intracell-inner-area carrier by the base station 1 which forms the cell 3 adjoining to the cell 4.

This may sometimes result in mutual interference since the same carriers can be used in adjoining cells simultaneously. Intracell-inner-area carriers have transmission power smaller than that of intracell-outer-area carriers, however, and the intracell-inner-area carriers are also used with smaller propagation losses between the base station and the mobile stations. Even in the presence of mutual interference as mentioned above, the ratio between the desired wave power and interference power of the carrier can thus be made to reach or exceed a required value in both the cells.

Now, in the present example, a carrier that is changed into an intracell-inner-area carrier in one cell is also changed into an intracell-inner-area carrier even in adjoining cells. Consequently, when carriers (carrier Nos. 7 to 9) belonging to the intracell-outer-area carriers are changed into intracell-inner-area carriers in the cell 4 of the base station 2 as described above, these carriers (carrier Nos. 7 to 9) are also changed into intracell-inner-area carriers, available for intracell-inner-area mobile stations, by the base station 1 which forms the cell 3 adjoining to the cell 4.

Consequently, according to the present example, the base station controller 5 increases the number of intracell-outer-area carriers of the base station 2 if the use rate of the intracell-inner-area carriers of the base station 1 is lower than the predetermined first use rate threshold and the use rate of the intracell-outer-area carriers of the base station 2 is higher than the predetermined second use rate threshold. This can reduce the possibility that the base station 2 may run short of the intracell-outer-area carriers, without substantially increasing the possibility that the base station 1 may run short of the intracell-inner-area carriers. On the other hand, if the use rate of the intracell-inner-area carriers of the base station 1 is higher than the predetermined third use rate threshold and the use rate of the intracell-outer-area carriers of the base station 2 is lower than the predetermined fourth use rate threshold, the base station controller 5 decreases the number of intracell-outer-area carriers of the base station 2. This makes it possible to reduce the possibility that the base station 2 may run short of the intracell-outer-area carriers without substantially increasing the possibility that the base station 1 may run short of the intracell-inner-area carriers. As a result, it is possible to improve the use efficiency of the carriers in the cellular system.

In other words, according to the present example, the allocation of the intracell-outer-area carriers for the base station 2 is changed in consideration of the use rate of the intracell-inner-area carriers of the base station 1. This makes it possible to increase the intracell-outer-area carriers of the base station 2 while avoiding interference resulting from the simultaneous use of the same carrier as in the intracell inner area of the base station 1.

As has been described, according to the present example, it is possible to optimize the numbers of carriers available in the inner areas and outer areas of the cells for improved use efficiency of the carriers in the cellular system where the carriers intended for intracell-inner-area mobile stations are used in every cell repeatedly and the carriers intended for intracell-outer-area mobile stations are used in every three cells repeatedly.

Note that the present example is based on the assumption that the first use rate threshold Uth_Low1, the third use rate threshold Uth_High1, the fourth use rate threshold Uth_Low2, and the second use rate threshold Uth_High2 are constant values. Nevertheless, the first use rate threshold Uth_Low1 and the third use rate threshold Uth_High1 may be determined in accordance with the number of intracell-inner-area carriers of the base station 1. The fourth use rate threshold Uth_Low2 and the second use rate threshold Uth_High2 may be determined in accordance with the number of intracell-outer-area carriers of the base station 2.

In the present example, the number of intracell-outer-area carriers of the base station 2 is increased/decreased without considering the use rate of the intracell-inner-area carriers of the base station 2. That this use rate is lower than or equal to a predetermined value, however, may be taken into account as a condition for increasing the intracell-outer-area carriers of the base station 2. This rate being higher than or equal to another predetermined value may also be taken into account as a condition for decreasing the intracell-outer-area carriers of the base station 2.

Example 2

Next, description will be given of example 2 of the present invention.

In the foregoing example 1, the base station controller 5 has changed the number of intracell-outer-area carriers of the base station 2 based on the use rate of the intracell-inner-area carriers of the base station 1 and the use rate of the intracell-outer-area carriers of the base station 2. In the present example, the base station controller 5 changes the number of intracell-outer-area carriers of the base station 2 based on the average number of intracell-inner-area carriers used in the base station 1 and the average number of intracell-outer-area carriers used in the base station 2 instead. In other respects, the present example is the same as example 1. Description thereof will thus be omitted.

In the present example, the base stations 1 and 2 each calculate the average number of intracell-inner-area carriers used, N_inner, at predetermined time intervals. This average number of use N_inner is calculated as follows. Initially, the base stations 1 and 2 each calculate the rates of time U_inner1, U_inner2, U_inner3, U_inner4, U_inner5, and U_inner6 at which the carriers 1 to 6, intracell-inner-area carriers, are used to transmit data blocks, respectively. Next, they calculate the sum of these rates (U_inner1+U_inner2+U_inner3+U_inner4+U_inner5+U_inner6). The sum calculated is the average number of intracell-inner-area carriers used, N_inner.

Similarly, the base stations 1 and 2 each calculate the average number of intracell-outer-area carriers used, N_outer.

Here, the base station 1 calculates the average number of intracell-outer-area carriers used, N_outer, as follows. Initially, the base station 1 calculates the rates of time U_outer7 and U_outer10 at which the two carriers (carrier Nos. 7 and 10), intracell-outer-area carriers, are used to transmit data block, respectively. It then calculates the sum of these rates (U_outer7+U_outer10). The sum calculated is the average number of intracell-outer-area carriers used, N_outer.

The base station 2 calculates the average number of intracell-outer-area carriers used, N_outer, as follows. Initially, the base station 2 calculates the rates of time U_outer8 and U_outer11 at which the two carriers (carrier Nos. 8 and 11), intracell-outer-area carriers, are used to transmit data blocks, respectively. It then calculates the sum of these rates (U_outer8+U_outer11). The sum calculated is the average number of intracell-outer-area carriers used, N_outer.

The base stations 1 and 2 each notify the foregoing calculations of the average number of intracell-inner-area carriers used, N_inner, and the average number of intracell-outer-area carriers used, N_outer, to the base station controller 5 at the predetermined time intervals mentioned above.

FIG. 4 is a flowchart showing the method of changing intracell-outer-area carriers according to the present example. The base station controller 5 initially receives the average number of intracell-inner-area carriers used, N_inner, from the base station 1, and receives the average number of intracell-outer-area carriers used, N_outer, from the base station 2 (steps S51 and S52).

If the average number of intracell-inner-area carriers used, N_inner, from the base station 1 is lower than a predetermined first use number threshold Nth_Low1 and the average number of intracell-outer-area carriers used, N_outer, from the base station 2 is higher than a predetermined second use number threshold Nth_High2, then the base station controller 5 increases the number of intracell-outer-area carriers of the base station 2 (steps S53, S54, and S55).

On the other hand, if the average number of intracell-inner-area carriers used, N_inner, from the base station 1 is higher than a predetermined third use number threshold Nth_High1 and the average number of intracell-outer-area carriers used, N_outer, from the base station 2 is lower than a predetermined fourth use number threshold Nth_Low2, then the base station controller 5 decreases the number of intracell-outer-area carriers of the base station 2 (steps S56, S57, and S58).

Here, the first use number threshold Nth_Low1 is set to a value lower than the third use number threshold Nth_High1. The fourth use number threshold Nth_Low2 is set to a value lower than the second use number threshold Nth_High2. In addition, the first use number threshold Nth_Low1 and the third use number threshold Nth_High1 are determined in accordance with the number of intracell-inner-area carriers. The fourth use number threshold Nth_Low2 and the second use number threshold Nth_High2 are determined in accordance with the number of intracell-outer-area carriers. For example, Nth_Low1=M_inner−4 and Nth_High1=M_inner−1, where M_inner is the number of intracell-inner-area carriers. Nth_Low2=M_outer−1.5 and Nth_High2=M_outer−0.5, where M_outer is the number of intracell-outer-area carriers.

Consequently, according to the present example, the base station controller 5 increases the number of intracell-outer-area carriers of the base station 2 if the average number of intracell-inner-area carriers used in the base station 1 is lower than the predetermined first use number threshold and the average number of intracell-outer-area carriers used in the base station 2 is higher than the predetermined second use number threshold. This can reduce the possibility that the base station 2 may run short of the intracell-outer-area carriers, without substantially increasing the possibility that the base station 1 may run short of the intracell-inner-area carriers. On the other hand, if the average number of intracell-inner-area carriers used in the base station 1 is higher than the predetermined third use number threshold and the average number of intracell-outer-area carriers used in the base station 2 is lower than the predetermined fourth use number threshold, the base station controller 5 decreases the number of intracell-outer-area carriers of the base station 2. This makes it possible to reduce the possibility that the base station 2 may run short of the intracell-outer-area carriers without substantially increasing the possibility that the base station 1 may run short of the intracell-inner-area carriers. As a result, it is possible to improve the use efficiency of the carriers in the cellular system.

In other words, according to the present example, the allocation of the intracell-outer-area carriers for the base station 2 is changed in consideration of the average number of intracell-inner-area carriers used in the base station 1. This makes it possible to increase the intracell-outer-area carriers of the base station 2 while avoiding interference resulting from the simultaneous use of the same carrier as in the intracell inner area of the base station 1.

In the present example, the number of intracell-outer-area carriers of the base station 2 is increased/decreased without considering the average number of intracell-inner-area carriers used in the base station 2. That this average number of use is lower than or equal to a predetermined value, however, may be taken into account as a condition for increasing the intracell-outer-area carriers of the base station 2. This number being higher than or equal to another predetermined value may also be taken into account as a condition for decreasing the intracell-outer-area carriers of the base station 2.

Example 3

Next, example 3 of the present invention will be described.

In the present example, as shown in a block diagram of the cellular system in FIG. 5, the base stations 1 and 2 are connected with a gateway (GW) 8 instead of the base station controller 5 of example 1, so that the base stations 1 and 2 can exchange control information with each other. The wireless network of this cellular system is composed of the base stations 1 and 2, and the cells 3 and 4 which are covered by the base stations 1 and 2.

In the foregoing example 1, the base station controller 5 has changed the intracell-outer-area carriers by using information on the statuses of use of carriers notified from the base stations 1 and 2, such as the use rates of the intracell-inner-area carriers and the intracell-outer-area carriers. Instead, in the present example, the base stations 1 and 2 exchange the information on the statuses of use of carriers with each other, and change the intracell-outer-area carriers by using the information. The present example is the same as example 1 in other respects, and description thereof will thus be omitted.

The base stations 1 and 2 each calculate the use rate U_inner of the intracell-inner-area carriers and the use rate U_outer of the intracell-outer-area carriers at predetermined time intervals. The calculation methods are the same as in example 1. The base stations 1 and 2 then exchange the information on U_inner and U_outer with each other at the foregoing predetermined time intervals.

FIG. 6 is a flowchart showing the method of changing intracell-outer-area carriers according to the present example. This processing is performed by the base station 2. The base station 2 initially receives the use rate U_inner of the intracell-inner-area carriers from the base station 1 which forms the cell 3 adjoining to the own cell 4, and calculates the use rate U_outer of the intracell-outer-area carriers in the base station 2 of the own cell (steps S71 and S72).

If the use rate U_inner of the intracell-inner-area carriers from the base station 1 is lower than a predetermined first use rate threshold Uth_Low1 and the calculated use rate U_outer of the intracell-outer-area carriers is higher than a predetermined second use rate threshold Uth_High2, the base station 2 increases the number of intracell-outer-area carriers of the base station 2 (steps S73, S74, and S75).

On the other hand, if the use rate U_inner of the intracell-inner-area carriers from the base station 1 is higher than a predetermined third use rate threshold Uth_High1 and the calculated use rate U_outer of the intracell-outer-area carriers is lower than a predetermined fourth use rate threshold Uth_Low2, the base station 2 decreases the number of intracell-outer-area carriers of the base station 2 (steps S76, S77, and S78).

Here, the first use rate threshold Uth_Low1 is set to a value lower than the third use rate threshold Uth_High1. The fourth use rate threshold Uth_Low2 is set to a value lower than the second use rate threshold Uth_High2.

Consequently, according to the present example, the base station 2 increases the number of intracell-outer-area carriers in the own cell if the use rate of the intracell-inner-area carriers in the adjoining cell is lower than the predetermined first use rate threshold and the use rate of the intracell-outer-area carriers in the own cell is higher than the predetermined second use rate threshold. This can reduce the possibility that the own cell may run short of the intracell-outer-area carriers, without substantially increasing the possibility that the adjoining cell may run short of the intracell-inner-area carriers. On the other hand, if the use rate of the intracell-inner-area carriers in the adjoining cell is higher than the predetermined third use rate threshold and the use rate of the intracell-outer-area carriers in the own cell is lower than the predetermined fourth use rate threshold, the base station 2 decreases the number of intracell-outer-area carriers in the own cell. This makes it possible to reduce the possibility that the own cell may run short of the intracell-outer-area carriers without substantially increasing the possibility that the adjoining cell may run short of the intracell-inner-area carriers. As a result, it is possible to improve the use efficiency of the carriers in the cellular system.

In other words, according to the present example, the allocation of the intracell-outer-area carriers in the own cell is changed in consideration of the use rate of the intracell-inner-area carriers in the adjoining cell. This makes it possible to increase the intracell-outer-area carriers in the own cell while avoiding interference resulting from the simultaneous use of the same carrier as in the intracell inner area of the adjoining cell.

Example 4

Next, example 4 of the present invention will be described.

In the present example, as shown in a block diagram of the cellular system in FIG. 5, the base stations 1 and 2 are connected with a gateway (GW) 8 instead of the base station controller 5 in the foregoing example 2, so that the base stations 1 and 2 can exchange control information with each other. The wireless network of this cellular system is composed of the base stations 1 and 2, and the cells 3 and 4 which are covered by the base stations 1 and 2.

In the foregoing example 2, the base station controller 5 has changed the intracell-outer-area carriers by using information on the statuses of use of carriers notified from the base stations 1 and 2, such as the average numbers of intracell-inner-area carriers and intracell-outer-area carriers used. Instead, in the present example, the base stations 1 and 2 exchange the information on the statuses of use of carriers with each other, and change the intracell-outer-area carriers by using the information. The present example is the same as the foregoing example 2 in other respects, and description thereof will thus be omitted.

The base stations 1 and 2 each calculate the average number of intracell-inner-area carriers used, N_inner, and the average number of intracell-outer-area carriers used, N_outer, at predetermined time intervals. The calculation methods are the same as in example 2. The base stations 1 and 2 then exchange the information on N_inner and N_outer with each other at the foregoing predetermined time intervals.

Figure 7:
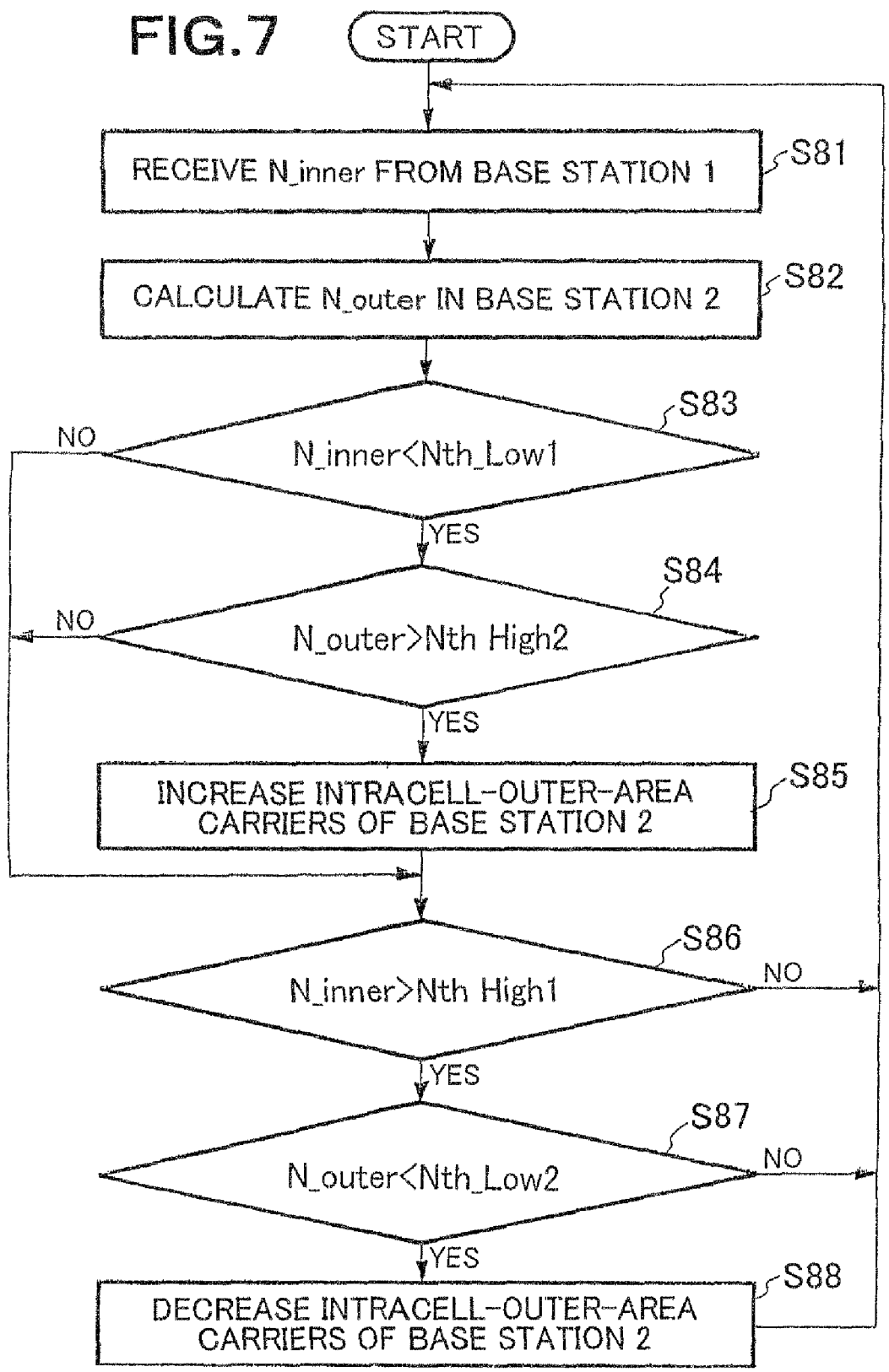
FIG. 7 is a flowchart showing a method of changing intra-cell-outer-area carriers according to example 4 of the present invention.

FIG. 7 is a flowchart showing the method of changing intracell-outer-area carriers according to the present example. This processing is performed by the base station 2. The base station 2 initially receives the average number of intracell-inner-area carriers used, N_inner, from the base station 1, and calculates the average number of intracell-outer-area carriers used in the base station 2, N_outer (steps S81 and S82).

If the average number of intracell-inner-area carriers used, N_inner, from the base station 1 is lower than a predetermined first use number threshold Nth_Low1 and the calculated average number of intracell-outer-area carriers used, N_outer, is higher than a predetermined second use number threshold Nth_High2, the base station 2 increases the number of intracell-outer-area carriers of the base station 2 (steps S83, S84, and S85).

On the other hand, if the average number of intracell-inner-area carriers used, N_inner, from the base station 1 is higher than a predetermined third use number threshold Nth_High1 and the calculated average number of intracell-outer-area carriers used, N_outer, is lower than a predetermined fourth use number threshold Nth_Low2, the base station 2 decreases the number of intracell-outer-area carriers of the base station 2 (steps S86, S87, and S88).

It should be noted that the method of setting the first use number threshold Nth_Low1, the third use number threshold Nth_High1, the fourth use number threshold Nth_Low2, and the second use number threshold Nth_High2 is the same as in the foregoing example 2.

Consequently, according to the present example, the base station 2 increases the number of intracell-outer-area carriers in the own cell if the average number of intracell-inner-area carriers used in the adjoining cell is lower than the predetermined first use number threshold and the average number of intracell-outer-area carriers used in the own cell is higher than the predetermined second use number threshold. This can reduce the possibility that the own cell may run short of the intracell-outer-area carriers, without substantially increasing the possibility that the adjoining cell may run short of the intracell-inner-area carriers. On the other hand, if the average number of intracell-inner-area carriers used in the adjoining cell is higher than the predetermined third use number threshold and the average number of intracell-outer-area carriers used in the own cell is lower than the predetermined fourth use number threshold, the base station 2 decreases the number of intracell-outer-area carriers in the own cell. This makes it possible to reduce the possibility that the own cell may run short of the intracell-outer-area carriers without substantially increasing the possibility that the adjoining cell may run short of the intracell-inner-area carriers. As a result, it is possible to improve the use efficiency of the carriers in the cellular system.

In other words, according to the present example, the allocation of the intracell-outer-area carriers in the own cell is changed in consideration of the average number of the intracell-inner-area carriers in the adjoining cell. This makes it possible to increase the intracell-outer-area carriers in the own cell while avoiding interference resulting from the simultaneous use of the same carrier as in the intracell inner area of the adjoining cell.

Example 5

Next, example 5 of the present invention will be described.

The present example is the same as the foregoing example 3 in the configuration of the cellular system and in the method of determining whether to increase or decrease intracell-outer-area carriers, but is different from example 3 in the assignment of carriers available to each cell. Since the present example is the same as the foregoing example 3 in other respects, description thereof will be omitted.

In the present example, a plurality of carriers for both uplink and downlink channels are divided into a carrier group 1 which is available for communication with mobile stations in the intracell inner areas, and a carrier group 2 which is available for communication with mobile stations in the intracell outer areas. The carrier group 1 simply uses the OFDM (Orthogonal Frequency Division Multiplex) method. The carrier group 2 combines the OFDM method with code multiplexing so that a plurality of mobile stations can use the same carriers to simultaneously communicate with base stations not only within an identical cell but also in adjoining cells.

When the base station 2 and the mobile station 6 perform communication therebetween, the carriers of the carrier group 1 are selected for use. When the base station 2 and the mobile station 7 perform communication therebetween, the carriers of the carrier group 2 are selected for use. When using the carrier group 2, the base station also selects and allocates codes for code multiplexing.

Figure 8:
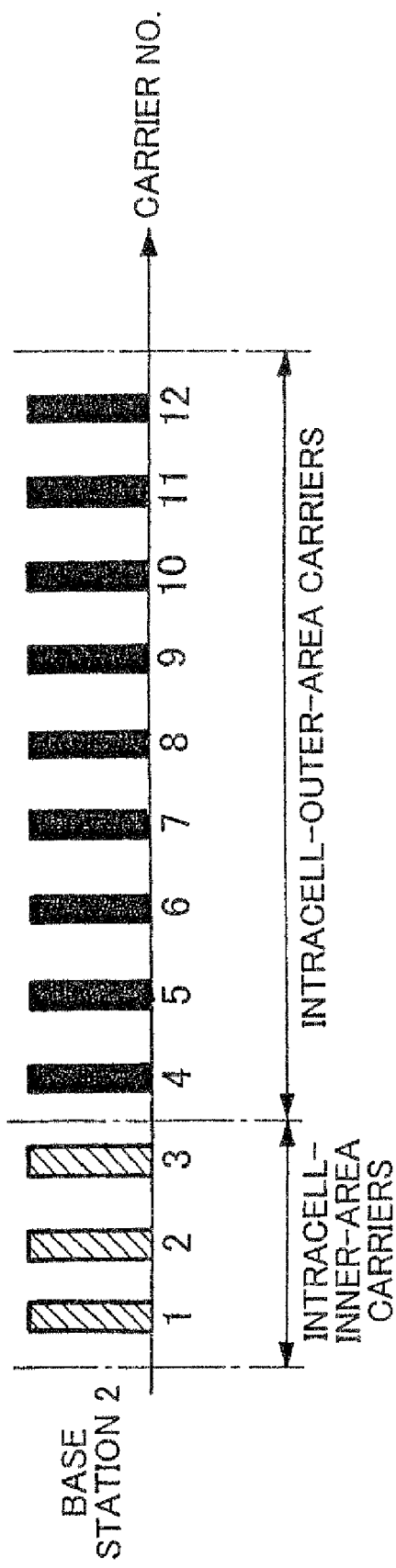
FIG. 8 is an example of carrier assignment according to examples 5 and 6 of the present invention.
Figure 9:
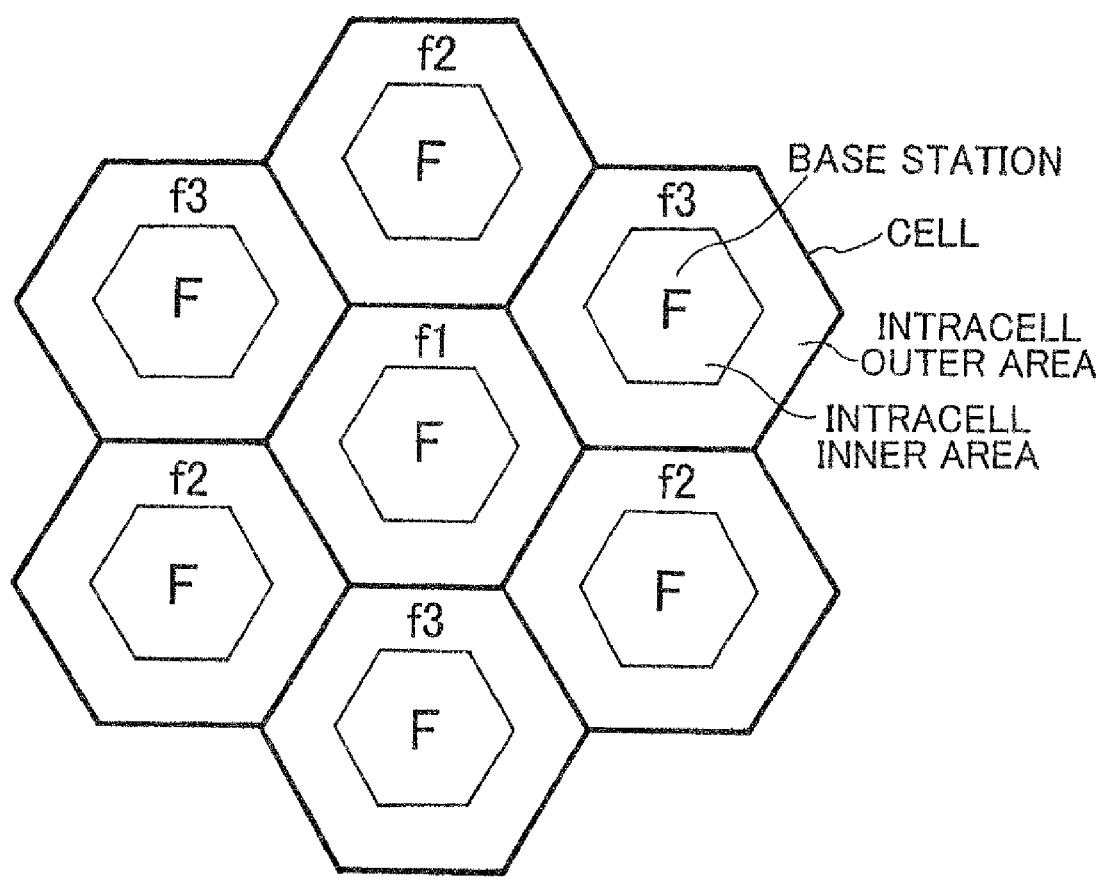
FIG. 9 is an example of assignment of carriers to cells according to conventional technology.

FIG. 8 shows the assignment of carriers to these carrier groups at a certain moment. This cellular system has 12 carriers (carrier Nos. 1 to 12) as the plurality of carriers available. Of these, three carriers (carrier Nos. 1 to 3) are assigned to the carrier group 1. Nine carriers (carrier Nos. 4 to 12) are assigned to the carrier group 2. Such a carrier assignment to the carrier groups is not necessarily common among all the cells, but is set cell by cell.

Here, intracell-outer-area carriers are increased/decreased in number according to a predetermined order of priority as to which carriers to be the intracell-outer-area carriers. Among the twelve carriers (carrier Nos. 1 to 12), ones having higher carrier numbers are used as intracell-outer-area carriers by priority. Both the carrier groups 1 and 2 can be changed in units of single carriers.

When increasing the number of intracell-outer-area carriers from the state of carrier assignment shown in FIG. 8, the base station 2 then excludes a carrier (carrier No. 3) from the intracell-inner-area carriers, and adds the carrier (carrier No. 3) to the intracell-outer-area carriers. When decreasing the number of intracell-outer-area carriers from the state of carrier assignment shown in FIG. 8, on the other hand, the base station 2 excludes a carrier (carrier No. 4) from the intracell-outer-area carriers, and adds the carrier (carrier No. 4) to the intracell-inner-area carriers.

In the present example, a carrier that is changed into an intracell-outer-area carrier in one cell may still be used as an intracell-inner-area carrier in adjoining cells, in which case the adjoining cells shall continue using the carrier as an intracell-inner-area carrier. Consequently, even if a carrier (carrier No. 3) is changed into an intracell-outer-area carrier in the cell 4 of the base station 2 as described above, the base station 1 of the cell 3 adjoining to the cell 4 continues using that carrier (carrier No. 3) as an intracell-inner-area carrier.

Now, in the present example, a carrier that is changed into an intracell-inner-area carrier in one cell is also changed into an intracell-inner-area carrier in adjoining cells. When a carrier (carrier No. 4) is changed into an intracell-inner-area carrier in the cell 4 of the base station 2 as described above, that carrier (carrier No. 4) is therefore also changed into an intracell-inner-area carrier in the base station 1 of the cell 3 adjoining to the cell 4 so that it is available for mobile stations in the intracell inner area.

Example 6

Next, example 6 of the present invention will be described.

The present example is the same as the foregoing example 4 in the configuration of the cellular system and in the method of determining whether to increase or decrease intracell-outer-area carriers. However, it is different from the foregoing example 4 but is the same as the foregoing example 5 in the assignment of carriers available for each cell. Since the present example is the same as the foregoing example 4 in other respects, description thereof will be omitted.

In the present example, a plurality of carriers for both uplink and downlink channels are divided, as in the foregoing example 5, into a carrier group 1 which is available for communication with mobile stations in the intracell inner areas, and a carrier group 2 which is available for communication with mobile stations in the intracell outer areas. The carrier group 1 simply uses the OFDM method. The carrier group 2 combines the OFDM method with code multiplexing so that a plurality of mobile stations can use the same carriers to simultaneously communicate with base stations not only within an identical cell but also in adjoining cells. The method of changing the carriers in each carrier group is the same as in the foregoing example 5. Description thereof will thus be omitted.

Other Examples

Description so far has been given of six examples 1 to 6 of the present invention. However, the present invention is not limited to the foregoing examples. For example, the present invention can be similarly practiced by using the probabilities and the like for the numbers of used carriers to exceed a predetermined value, as the statuses of use of the intracell-inner-area carriers and intracell-outer-area carriers.

Known configurations may be applied to the internal configurations of the wireless networks (base stations, base station controller) that constitute the cellular systems, and of the mobile stations according to the foregoing examples 1 to 6. The base stations, for example, have such known circuits as a base station antenna, a transmitter receiver circuit, a modulation demodulation circuit, a control circuit, a signal processing circuit, and an interface circuit. The base station controller, for example, has such known circuits as a CPU (Central Processing Unit), memories (ROM (Read Only Memory)/RAM (Random Access Memory)), and an interface circuit intended for connection with base stations. The mobile stations, for example, have such known circuits as a mobile station antenna, a transmitter receiver circuit, a modulation demodulation circuit, a control circuit, and a signal processing circuit. Examples of applicable mobile stations include portable terminals such as a cellular phone, a PHS (Personal Handy Phone), and a PDA (Personal Digital Assistant), and mobile terminals such as a car-mounted terminal.

For example, in a mode where each base station is connected with the base station controller as in the foregoing examples 1 and 2, the wireless network may be configured as follows. Here, each base station may measure the use rates, the average numbers of use, or other statuses of use of the intracell-inner-area carriers and intracell-outer-area carriers as described above by using a control circuit or a signal processing circuit, for example, and transmit the measurements to the base station controller through an interface circuit. In the base station controller, for example, a CPU may execute a control program which is loaded on a memory in advance, and change the number of intracell-outer-area carriers as described above based on the measurements transmitted from each base station according to the flow shown in FIG. 3 or 4. In this example, the flow shown in FIG. 3 or 4 may be stored in a ROM or other memory in advance in the form of a control program executable to the CPU of the base station controller. This control program and a memory or other recording medium containing the same are intended to be embraced in the scope of the present invention.

In a mode where base stations are connected through a gateway as in the foregoing examples 3 and 4, the wireless network may be configured as follows. Here, each base station may receive the use rates, the average numbers of use, or other statuses of use of intracell-inner-area carriers in the adjoining cell as described above, calculate the use rate, the average number of use, or other status of use of intracell-outer-area carriers in the own cell, and change the number of intracell-outer-area carriers in the own cell based on these in accordance with the flow of FIG. 6 or 7 by using a control circuit or a signal processing circuit, for example. In this example, the flow shown in FIG. 6 or 7 may be stored in a ROM or other memory in advance in the form of a control program executable to a processor inside the control circuit or signal processing circuit of each base station. This control program and a memory or other recording medium containing the same are intended to be embraced in the scope of the present invention.

It should be appreciated that the statuses of use of the first and second carriers may be the use rates of the first and second carriers. In this case, the step of changing the number of second carriers may include the steps of: increasing the number of second carriers in the second cell if the use rate of the first carriers in the first cell is lower than a predetermined first use rate threshold and the use rate of the second carriers in the second cell is higher than a predetermined second use rate threshold; and decreasing the number of second carriers in the second cell if the use rate of the first carriers in the first cell is higher than a predetermined third use rate threshold and the use rate of the second carriers in the second cell is lower than a predetermined fourth use rate threshold.

The statuses of use of the first and second carriers may be the average numbers of first and second carriers used. In this case, the step of changing the number of second carriers may include the steps of: increasing the number of second carriers in the second cell if the average number of first carriers used is lower than a predetermined first use number threshold and the average number of second carriers used is higher than a predetermined second use number threshold; and decreasing the number of second carriers in the second cell if the average number of first carriers used is higher than a predetermined third use number threshold and the average number of second carriers used is lower than a predetermined fourth use number threshold.

The step of dividing the plurality of carriers into first carriers and second carriers, and allocating the same for each of the plurality of cells may include allocating the first carriers and the second carriers for each of the plurality of cells so that the first carriers are used in a greater number of cells than the second carriers are.

The second carriers may be code-multiplexed so that the plurality of mobile stations can simultaneously communicate with the base stations.

The step of classifying each of the plurality of mobile stations as an intracell-inner-area mobile station or an intracell-outer-area mobile station may include: a step in which the plurality of base stations transmit a pilot signal; a step in which the mobile station receives the pilot signal transmitted from one or more of the base stations; and a step of determining the mobile station in question to be the intracell-inner-area mobile station if the ratio of the highest reception quality level to the second highest among those of the pilot signals received from the one or more base stations is higher than a predetermined intracell-inner-area threshold, and determining the mobile station in question to be the intracell-outer-area mobile station if not.

Order of selection may be set between the plurality of carriers in advance. When changing the numbers of second carriers in the first cell and the second cell, the carriers to be the second carriers may be determined according to the order of selection.

Figure 10:
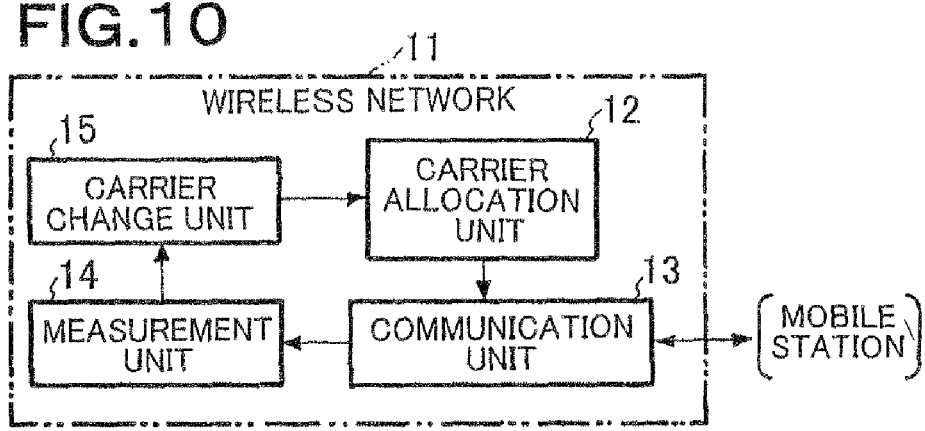
FIG. 10 is a block diagram of a wireless network in a cellular system according to another example of the present invention.

The wireless network, base stations, and mobile stations of the cellular system may also be configured as follows:

1) The cellular system is composed of a wireless network and a plurality of mobile stations, the wireless network including at least a plurality of base stations. A plurality of carriers is available for communication between the base stations and the mobile stations. In this configuration, as shown in FIG. 10, the wireless network 11 comprises a carrier allocation unit 12, a communication unit 13, a measurement unit 14, and a carrier change unit 15. The carrier allocation unit 12 divides the plurality of carriers into first carriers and second carriers, and allocate the same for each of a plurality of cells formed by the plurality of base stations. The communication unit 13 classifies each of the plurality of mobile stations as an intracell-inner-area mobile station or an intracell-outer-area mobile station, performs communication with the intracell-inner-area mobile station by using the first carriers, and performs communication with the intracell-outer-area mobile station by using the second carriers. Based on data communicated by the communication unit 13, the measurement unit 14 measures the status of use of the first carriers in a first cell out of the plurality of cells, and the status of use of the second carriers in a second cell out of the plurality of cells. The carrier change unit 15 changes the number of second carriers in the second cell based on the status of use of the first carriers in the first cell and the status of use of the second carriers in the second cell.

Figure 11:
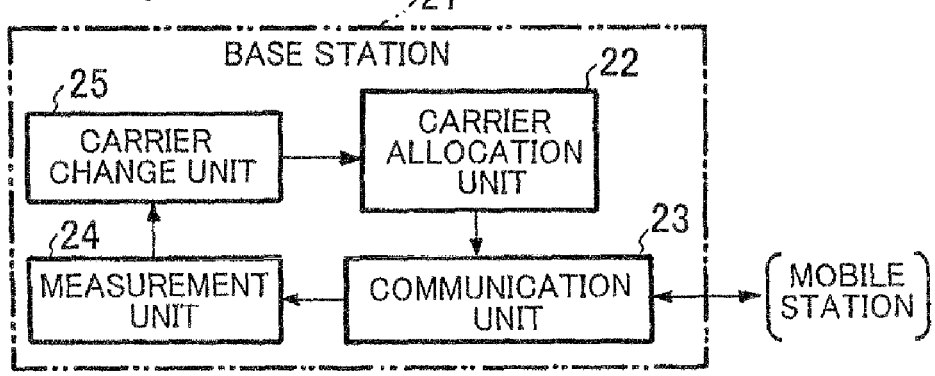
FIG. 11 is a block diagram of a base station in a cellular system according to another example of the present invention.

2) The cellular system is composed of a wireless network and a plurality of mobile stations, the wireless network including at least a plurality of base stations. A plurality of carriers is available for communication between the base stations and the mobile stations. In this configuration, as shown in FIG. 11, a base station 21 comprises a carrier allocation unit 22, a communication unit 23, a measurement unit 24, and a carrier change unit 25. The carrier allocation unit 22 divides the plurality of carriers into first carriers and second carriers, and allocate the same for each of a plurality of cells formed by the plurality of base stations. The communication unit 23 classifies each of the plurality of mobile stations as an intracell-inner-area mobile station or an intracell-outer-area mobile station, performs communication with the intracell-inner-area mobile station by using the first carriers, and performs communication with the intracell-outer-area mobile station by using the second carriers. Based on data communicated by the communication unit 23, the measurement unit 24 measures the status of use of the first carriers in a first cell out of the plurality of cells, and the status of use of the second carriers in a second cell out of the plurality of cells. The carrier change unit 25 changes the number of second carriers in the second cell based on the status of use of the first carriers in the first cell and the status of use of the second carriers in the second cell.

Figure 12:
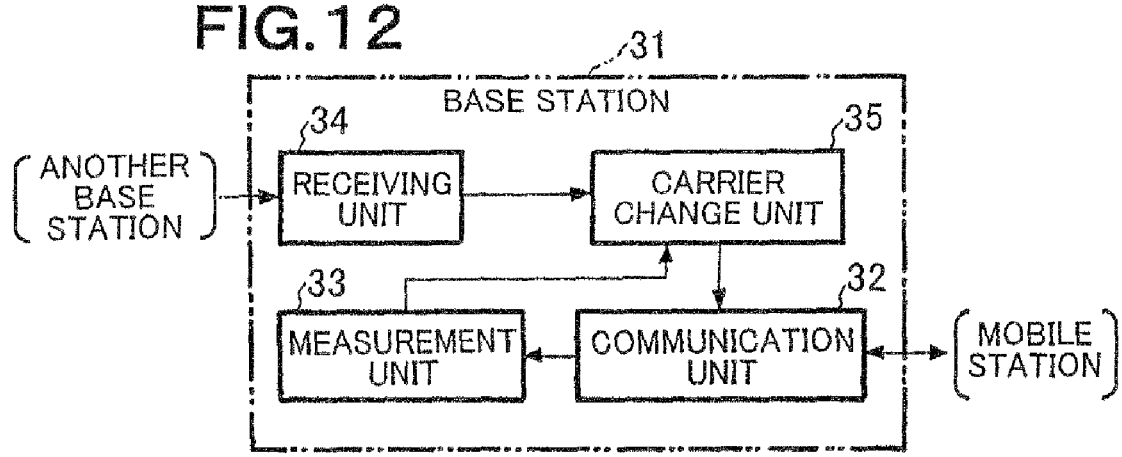
FIG. 12 is a block diagram of a base station in a cellular system according to another example of the present invention.

3) The cellular system is composed of a wireless network and a plurality of mobile stations, the wireless network including at least a plurality of base stations. A plurality of carriers is available for communication between the base stations and the mobile stations. In this configuration, as shown in FIG. 12, a base station 31 comprises a communication unit 32, a measurement unit 33, a receiving unit 34, and a carrier change unit 35. The communication unit 32 classifies each of the plurality of mobile stations as an intracell-inner-area mobile station or an intracell-outer-area mobile station, performs communication with the intracell-inner-area mobile station by using the first carriers, and performs communication with the intracell-outer-area mobile station by using the second carriers. Based on data communicated by the communication unit 32, the measurement unit 33 measures the status of use of the first carriers in a first cell out of a plurality of cells. The receiving unit 34 receives the status of use of the second carriers in a second cell out of the plurality of cells, from another base station out of the plurality of base stations. The carrier change unit 35 changes the number of second carriers in the second cell based on the status of use of the second carriers in the second cell and the status of use of the first carriers in the first cell.

Figure 13:
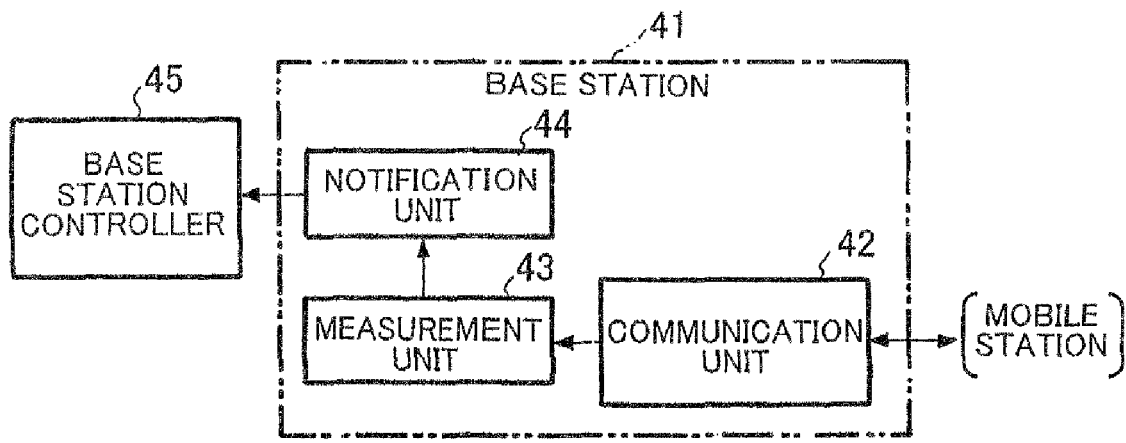
FIG. 13 is a block diagram of a base station in a cellular system according to another example of the present invention.

4) The cellular system is composed of a wireless network and a plurality of mobile stations, the wireless network including at least a plurality of base stations and a base station controller connected with each of the base stations. A plurality of carriers is available for communication between the base stations and the mobile stations. In this configuration, as shown in FIG. 13, a base station 41 comprises a communication unit 42, a measurement unit 43, and a notification unit 44. The communication unit 42 classifies each of the plurality of mobile stations as an intracell-inner-area mobile station or an intracell-outer-area mobile station, performs communication with the intracell-inner-area mobile station by using the first carriers, and performs communication with the intracell-outer-area mobile station by using the second carriers. Based on data communicated by the communication unit 42, the measurement unit 43 measures the status of use of the first carriers in a first cell out of a plurality of cells, and the status of use of the second carriers in a second cell out of the plurality of cells. The notification unit 44 notifies the status of use of the first carriers in the first cell and the status of use of the second carriers in the second cell to the base station controller 45. Base on the notification from the notification unit 44 of the base station 41, the base station controller 45 changes the number of second carriers in the second cell.

Figure 14:
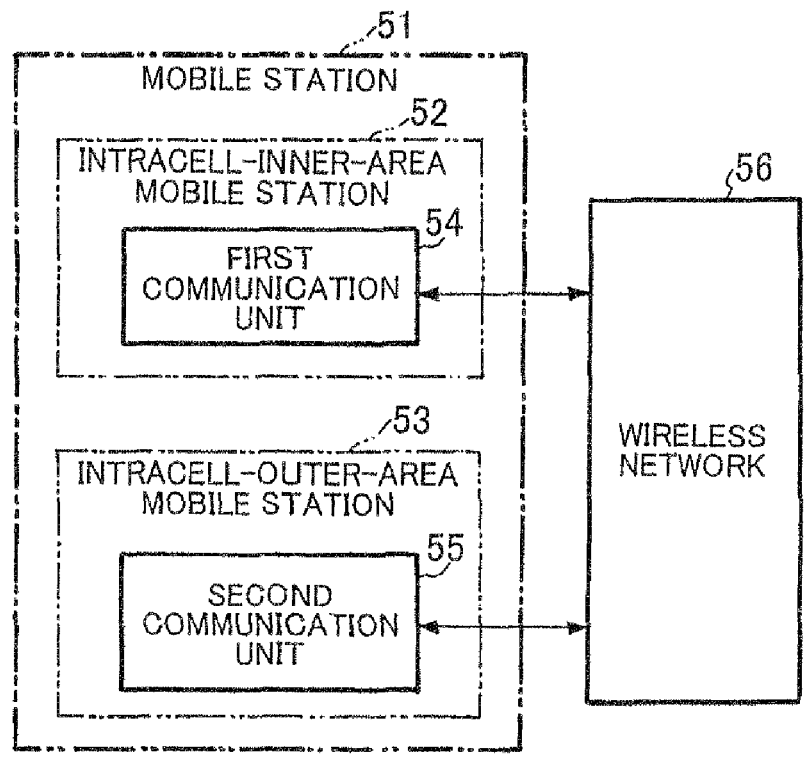
FIG. 14 is a block diagram of a mobile station in a cellular system according to another example of the present invention.

5) The cellular system is composed of a wireless network and a plurality of mobile stations, the wireless network including at least a plurality of base stations. A plurality of carriers is available for communication between the base stations and the mobile stations. In this configuration, as shown in FIG. 14, mobile stations 51 are classified by a wireless network 56 into intracell-inner-area mobile stations 52 and intracell-outer-area mobile stations 53. The intracell-inner-area mobile stations 52 have a first communication unit 54 for performing communication with a base station by using first carriers that are allocated thereto by the wireless network out of the plurality of carriers. The intracell-outer-area mobile stations 53 have a second communication unit 55 for performing communication with a base station by using second carriers that are allocated thereto by the wireless network out of the plurality of carriers. Based on the status of use of the first carriers in a first cell out of a plurality of cells and the status of use of the second carriers in a second cell out of the plurality of cells, the wireless network 56 changes the number of second carriers in the second cell.

It should be noted that the hardware and software configurations for practicing the individual components (individual means) of the wireless network, base stations, and mobile stations of the foregoing cellular systems are riot limited in particular. Any configurations may be applied as long as they are capable of achieving the functions of the components. For example, the components may be configured as respective separate circuits function by function; otherwise, the functions of the components may be put into a single circuit collectively. All the functions may be achieved chiefly by software processing.

Up to this point, the present invention has been described with reference to the examples. However, the present invention is not limited to the foregoing examples. The configurations and details of the present invention are subject to various modifications accessible to those skilled in the art within the scope of the invention.

CROSS-REFERENCE TO RELATED APPLICATIONS

This present application is based upon and claims the benefit of priority from Japanese patent application No. 2006-192884, filed on Jul. 13, 2006, the disclosure of which is incorporated herein in its entirety by reference.

INDUSTRIAL APPLICABILITY

The present invention is applicable to a cellular system, a carrier allocation method thereof, a base station, and a mobile station. For example, it may be applied to a cellular system in which a wireless network and mobile stations perform communication therebetween by using different carriers in the inner side and outer side of a cell.

The invention claimed is:

1. A method of allocating carriers of a cellular system including a wireless network and a plurality of mobile stations, the wireless network including at least a plurality of base stations, a plurality of carriers being available for communication between the base stations and the mobile stations, the method comprising:

a step in which the wireless network divides the plurality of carriers into first carriers and second carriers, and allocates the same for each of a plurality of cells formed by the plurality of base stations;

a step in which the wireless network classifies each of the plurality of mobile stations as an intracell-inner-area mobile station that is in an intracell inner area of a cell formed by one of the base stations or an intracell-outer-area mobile station that is in an intracell outer area of the cell, the intracell inner area being closer to the base station than the intracell outer area, the classification of the mobile stations being carried out based on the propagation losses of signals transmitted from one or more of the base stations to the mobile station in question;

a step in which the wireless network performs communication with the intracell-inner-area mobile station by using the first carriers, and performs communication with the intracell-outer-area mobile station by using the second carriers;

a step in which the wireless network measures a status of use of the first carriers in a first cell out of the plurality of cells based on communicated data;

a step in which the wireless network measures a status of use of the second carriers in a second cell out of the plurality of cells based on communicated data; and a step in which the wireless network changes the number of the second carriers used for the intracell-outer-area mobile stations in the second cell based on at least the status of use of the first carriers used for the intracell-inner-area mobile stations in the first cell and the status of use of the second carriers in the second cell measured.

2. The method of allocating carriers of a cellular system according to claim 1, wherein the statuses of use of the first and second carriers are use rates of the first and second carriers; and the step in which the wireless network changes the number of the second carriers includes:

a step of increasing the number of the second carriers in the second cell if the use rate of the first carriers in the first cell is lower than a predetermined first use rate threshold and the use rate of the second carriers in the second cell is higher than a predetermined second use rate threshold; and a step of decreasing the number of the second carriers in the second cell if the use rate of the first carriers in the first cell is higher than a predetermined third use rate threshold and the use rate of the second carriers in the second cell is lower than a predetermined fourth use rate threshold.

3. The method of allocating carriers of a cellular system according to claim 1, wherein the statuses of use of the first and second carriers are the average numbers of the first and second carriers used; and the step in which the wireless network changes the number of the second carriers includes:

a step of increasing the number of the second carriers in the second cell if the average number of the first carriers used is lower than a predetermined first use number threshold and the average number of the second carriers used is higher than a predetermined second use number threshold; and a step of decreasing the number of the second carriers in the second cell if the average number of the first carriers used is higher than a predetermined third use number threshold and the average number of the second carriers used is lower than a predetermined fourth use number threshold.

4. The method of allocating carriers of a cellular system according to claim 1, wherein the step in which the wireless network divides the plurality of carriers into the first carriers and the second carriers and allocates the same for each of the plurality of cells, allocates the first carriers and the second carriers for each of the plurality of cells so that the first carriers are used in a greater number of cells than the second carriers are.

5. The method of allocating carriers of a cellular system according to claim 1, wherein the second carriers are code-multiplexed so that the plurality of mobile stations can simultaneously communicate with the base stations.

6. The method of allocating carriers of a cellular system according to claim 1, wherein the step in which the wireless network classifies each of the plurality of mobile stations as an intracell-inner-area mobile station or an intracell-outer-area mobile station includes:

a step in which the plurality of base stations transmit a pilot signal;

a step in which the mobile station receives the pilot signal transmitted from one or more of the base stations; and a step of determining the mobile station in question to be the intracell-inner-area mobile station if the ratio of the highest reception quality level to the second highest among those of the pilot signals received from the one or more base stations is higher than a predetermined intracell-inner-area threshold, and determining the mobile station in question to be the intracell-outer-area mobile station if not.

7. The method of allocating carriers of a cellular system according to claim 1, wherein
order of selection is set between the plurality of carriers in advance; and
when changing the numbers of the second carriers in the first cell and the second cell, the carriers to be the second carriers are determined according to the order of selection.

8. A cellular system comprising a wireless network and a plurality of mobile stations, the wireless network including at least a plurality of base stations, a plurality of carriers being available for communication between the base stations and the mobile stations, wherein
the wireless network includes:
a carrier allocation unit which divides the plurality of carriers into first carriers and second carriers, and allocates the same for each of a plurality of cells formed by the plurality of base stations;
a communication unit which:
classifies each of the plurality of mobile stations as an intracell-inner-area mobile station that is in an intracell inner area of a cell formed by one of the base stations or an intracell-outer-area mobile station that is in an intracell outer area of the cell, the intracell inner area being closer to the base station than the intracell outer area, the classification of the mobile stations being carried out based on the propagation losses of signals transmitted from one or more of the base stations to the mobile station in question,
performs communication with the intracell-inner-area mobile station by using the first carriers, and
performs communication with the intracell-outer-area mobile station by using the second carriers;
a measurement unit which measures a status of use of the first carriers in a first cell out of the plurality of cells, and a status of use of the second carriers in a second cell out of the plurality of cells based on data communicated by the communication unit; and
a carrier change unit which changes the number of the second carriers used for the intracell-outer-area mobile stations in the second cell based on the status of use of the first carriers used for the intracell-inner-area mobile stations in the first cell and the status of use of the second carriers in the second cell.

9. A base station of a cellular system including a wireless network and a plurality of mobile stations, the wireless network including at least a plurality of base stations, a plurality of carriers being available for communication between the base stations and the mobile stations, the base station comprising:
a carrier allocation unit which divides the plurality of carriers into first carriers and second carriers, and allocates the same for each of a plurality of cells formed by the plurality of base stations;
a communication unit which:
classifies each of the plurality of mobile stations as an intracell-inner-area mobile station that is in an intracell inner area of a cell formed by one of the base stations or an intracell-outer-area mobile station that is in an intracell outer area of the cell, the intracell inner area being closer to the base station than the intracell outer area, the classification of the mobile stations being carried out based on the propagation losses of signals transmitted from one or more of the base stations to the mobile station in question,
performs communication with the intracell-inner-area mobile station by using the first carriers, and
performs communication with the intracell-outer-area mobile station by using the second carriers;
a measurement unit which measures a status of use of the first carriers in a first cell out of the plurality of cells, and a status of use of the second carriers in a second cell out of the plurality of cells based on data communicated by the communication unit; and
a carrier change unit which changes the number of the second carriers used for the intracell-outer-area mobile stations in the second cell based on the status of use of the first carriers used for the intracell-inner-area mobile stations in the first cell and the status of use of the second carriers in the second cell.

10. A base station of a cellular system including a wireless network and a plurality of mobile stations, the wireless network including at least a plurality of base stations, a plurality of carriers being available for communication between the base stations and the mobile stations, the base station comprising:
a communication unit which:
classifies each of the plurality of mobile stations as an intracell-inner-area mobile station that is in an intracell inner area of a cell formed by one of the base stations or an intracell-outer-area mobile station that is in an intracell outer area of the cell, the intracell inner area being closer to the base station than the intracell outer area, the classification of the mobile stations being carried out based on the propagation losses of signals transmitted from one or more of the base stations to the mobile station in question,
performs communication with the intracell-inner-area mobile station by using the first carriers, and
performs communication with the intracell-outer-area mobile station by using the second carriers;
a measurement unit which measures a status of use of the first carriers in a first cell out of the plurality of cells based on data communicated by the communication unit;
a receiving means for receiving a status of use of the second carriers in a second cell out of the plurality of cells, from another base station out of the plurality of base stations; and
a carrier change unit which changes the number of the second carriers used for the intracell-outer-area mobile stations in the second cell based on the status of use of the second carriers used for the intracell-inner-area mobile stations in the second cell and the status of use of the first carriers in the first cell.

11. A base station of a cellular system including a wireless network and a plurality of mobile stations, the wireless network including at least a plurality of base stations and a base station controller connected with each of the base stations, a plurality of carriers being available for communication between the base stations and the mobile stations, the base station comprising:
a communication unit which:
classifies each of the plurality of mobile stations as an intracell-inner-area mobile station that is in an intracell inner area of a cell formed by one of the base stations or an intracell-outer-area mobile station that is in an intracell outer area of the cell, the intracell inner area being closer to the base station than the intracell outer area, the classification of the mobile stations being carried out based on the propagation losses of signals transmitted from one or more of the base stations to the mobile station in question, performs communication with the intracell-inner-area mobile station by using the first carriers, and performs communication with the intracell-outer-area mobile station by using the second carriers;

a measurement unit which measures a status of use of the first carriers in a first cell out of the plurality of cells, and a status of use of the second carriers in a second cell out of the plurality of cells based on data communicated by the communication unit; and a notification unit which notifies the status of use of the first carriers in the first cell and the status of use of the second carriers in the second cell to the base station controller, wherein the base station controller changes the number of the second carriers used for the intracell-outer-area mobile stations in the second cell based on the notification from the notification means.

12. A mobile station of a cellular system including a wireless network and a plurality of mobile stations, the wireless network including at least a plurality of base stations, a plurality of carriers being available for communication between the base stations and the mobile stations, the mobile station comprising:

an intracell-inner-area mobile station that is used when the mobile station is classified by the wireless network as an intracell-inner-area mobile station that is in an intracell inner area of a cell formed by one of the base stations, including a first communication means for performing communication with the base stations by using first carriers that are allocated thereto by the wireless network out of the plurality of carriers; and an intracell-outer-area mobile station that is used when the mobile station is classified by the wireless network as an intracell-outer-area mobile station that is in an intracell outer area of the cell, including a second communication means for performing communication with the base stations by using second carriers that are allocated thereto by the wireless network out of the plurality of carriers, wherein the intracell inner area is closer to the base station of the cell than the intracell outer area, the classification of the mobile stations is carried out based on the propagation losses of signals transmitted from one or more of the base stations to the mobile station in question; and the number of the second carriers used for the intracell-outer-area mobile stations in the second cell is changed by the wireless network based on a status of use of the first carriers in a first cell out of the plurality of cells and a status of use of the second carriers in a second cell out of the plurality of cells, the statuses being measured by the wireless network based on data communicated with the base stations by the first and second communication means.

\* \* \* \* \*